United States Patent
Sivetz (10) Patent No.: US 6,514,552 B1
(45) Date of Patent: Feb. 4, 2003

(54) METHOD FOR KEEPING ROAST COFFEE BEAN FRESHNESS

(76) Inventor: Michael Sivetz, 3635 NW. Elmwood Dr., Corvallis, OR (US) 97330

( * ) Notice: Subject to any disclaimer, the term of this patent is extended or adjusted under 35 U.S.C. 154(b) by 0 days.

(21) Appl. No.: 09/535,055

(22) Filed: Mar. 24, 2000

(51) Int. Cl.[7] .................................................. A23F 5/10
(52) U.S. Cl. ....................... 426/393; 426/392; 426/404; 426/410; 426/419; 426/466; 426/595; 426/524
(58) Field of Search ................................ 426/595, 594, 426/393, 395, 118, 404, 397, 410, 419, 524, 466, 392

(56) References Cited

U.S. PATENT DOCUMENTS

| | | |
|---|---|---|
| 3,333,963 A | 8/1967 | Moon et al. |
| 3,506,446 A | 4/1970 | Champion |
| 4,234,613 A | 11/1980 | Lewis |
| 4,267,200 A | 5/1981 | Klien et al. |
| 4,501,761 A | 2/1985 | Mahlmann et al. |
| 4,552,767 A | 11/1985 | Saleeb et al. |
| 4,591,508 A | 5/1986 | Pultinas, Jr. |
| 4,988,590 A | 1/1991 | Price et al. |
| 5,208,058 A | 5/1993 | Kotani et al. |
| 5,361,560 A | 11/1994 | Sandolo |
| 5,368,875 A | 11/1994 | Hibi et al. |
| 5,532,011 A | 7/1996 | Goglio |
| 5,768,859 A | 6/1998 | Goglio |
| 5,908,652 A | 6/1999 | Sakano |
| 6,000,144 A | 12/1999 | Bussmann et al. |

FOREIGN PATENT DOCUMENTS

| | | | |
|---|---|---|---|
| CA | 1063864 | | 10/1979 |
| DE | 2031999 | * | 3/1972 |
| EP | 534051 | * | 3/1993 |
| JP | 8-000175 | * | 1/1996 |
| JP | 8-000175 | | 9/1996 |
| WO | WO9857862 | * | 12/1998 |

OTHER PUBLICATIONS

Chemie Mikrobiologie Technologie der Lebensmittel, 6(2)33–35 (Dialog Abstract 00180218, File 51, 1979.*
Verpackungs–Rundschau, 34(5) 471–473 (Dialog Abstract 00275734, Item 5 From File:51), 1983.*
Lebensmittelindustrie, 36(4) 155–158 (Dialog Abstract 00631754 Item 1 From File 51), 1989.*
Verpackungs–Rundschau, 35(3)253–54,256,258,260 (Dialog Abstract. 00287229 Item 16 From File 51), 1984.*
Shokunin Kogyo Gakkaishi, 30(8) 435–441 (Dialog Abstract 00298883 Item 15 From File 51), 1983.*
Chemie Mikrbiologie Technologie Der Lebensmitter, 6(1) 25–30 (Dialog Abstract 00181834, Item 23 From File 51), 1979.*
Food Engineering International, 7(11) 50–52 (Dialog Abstract 00239075 Item 17 From File 51), 1982.*
International Food Marketing & Technology P(6), 54 (Dialog Abstract 00711762, Item 3 From File 53), 1994.*
Assoc. Scientifique Internationale Du Safe(14th Symposium pp. 165–174 (Dialog Abstract 00642455 Item 10 From File 51), 1992.*
Gourmet News, p27 (Dialog Abstract 282618 Item 3 From File 79), Mar. 1998.*

(List continued on next page.)

*Primary Examiner*—Steve Weinstein
(74) *Attorney, Agent, or Firm*—Dellett and Walters (57) ABSTRACT

Roast coffee bean freshness is maintained by storing just roasted beans in a sealed container having much less than 1.0% oxygen therein. Storage of roasted coffee at very low temperatures (less than –40 degrees F. (–40 degrees C.)) also preserves the freshness of the coffee. The combination of low oxygen and low temperature storage provides the freshly roasted coffee taste and a long shelf life for that preserved taste.

19 Claims, 4 Drawing Sheets

OTHER PUBLICATIONS

Technologie Alime–Itali, 4(9) 39–41 (Dialog Abstract 00221058 Item 2 From File 51), 1981.*

Andersson et al, "Influence of Oxygen Concentration on the Flavour and Chemical Stability of Cream Powder", Lebensm.–Wiss. u.–Technol., Academic Press, vol. 31, 1998, No. 3, pp. 245–250.

Bishov et al, "Quality and Stability of Some Freeze–Dried Foods in 'Zero' Oxygen Headspace", Journal of Food Science, vol. 36, 1971, pp. 532–535.

Balart, "History of Vacuum Packed Coffee", 1937 Annual Convention of the Associated Coffee Industries of America, American Can Company, Nov. 8–10, 1937, pp. 1–21.

* cited by examiner

METHOD FOR KEEPING ROAST COFFEE BEAN FRESHNESS

BACKGROUND OF THE INVENTION

This invention relates to coffee, and more specifically to methods and apparatus for retaining the freshness of just roasted coffee beans.

The aroma of freshly roasted and ground coffee beans appeals to almost everyone, even children and non-coffee drinkers. However, the marketed coffees pale in aroma and taste compared to the freshly prepared beverages. U.S. Pat. No. 5,368,875 to Hibi et al illustrates the reasons for this difference, as do the Sivetz books: *Coffee Processing Technology* 1963 and *Coffee Technology* 1979 and *Coffee Quality* 1998. Some causes for poor quality are due to the selection of the inferior bean qualities, inefficient methods of roasting, and especially slow cooling of the beans after roasting, up to 24 hour storage of beans before grinding, and additional storage time of the ground beans. The latter two steps are done deliberately to degas the carbon dioxide from the roasted coffee, so that thinner walled evacuated metal cans of roast and ground coffee can be packaged. The degassing steps also cause a major loss in aromatics as well as oxidation, called staling. The fact is that most roast and ground canned coffees are stale at the time of packaging, months before the package of coffee reaches the consumer. Further, the can evacuating machinery, owned and maintained by the steel can fabricators, was developed and applied over 60 years ago, before WWI, and virtually nothing has changed in their performance since. Although, the evacuated cans are alleged to have 90% of their air removed, leaving 2 volume % oxygen, it is well known that residual oxygen in the cans can be as high as 3 or 4%, and much much higher in valve bagged and pouched packages. These conditions clearly and quickly (within 12 hours) result in oxidation of the packaged beans or ground coffee. The major roasters who roast and grind coffees have caused even further quality down grading by adding several percent water, which accelerates the rate and degree of staling. They have also caused complete degassing and produced "brick packs", which is stale aromaless oxidized coffee. Additional down grading has occurred, by using increasing percentages of lower cost, lower taste quality Robusta beans, higher levels of low altitude grown beans with many defects, and finally creating a system of distribution that causes the canned roast and ground coffee to be in storage or transport for between 3 to 12 months, resulting in continued deterioration of the coffee before it ever reaches the consumer. The latest methods of distribution of roasted beans in valve bags, although less degrading than the roast and ground (R&G) in cans methods, still delivers stale oxidized beans in bulk valve bags, subsequently stored in bean display bins in super markets, thereby undergoing further oxidation. It can be said without contradiction, that roasted beans from such bins are very stale.

There are widespread claims by roasters, extolling the unique tastes of coffee beans originating from various geographical areas, e.g., Jamaica, Celebes, Ethiopia, etc. However, the uniqueness of origin is totally lost after the roasted beans oxidize and stale. And such taste distinguishing claims, at the consumer level, not significant.

Some of the factors contributing to the public acceptance as well as provider acceptance of such poor quality stale coffees is the claims by the roasters, that they are delivering "freshly" roasted roast and ground coffees, because vacuum packaging preserves that freshness. This is not true. The truth is that what is sealed in the can and often in the bag, is not freshly roasted at the time of sealing the package. Further, the term "vacuum" is loosely used, without defining degree of vacuum, and its significance to freshness is not even well understood by the roaster/packager. In addition, the roaster/packager assumes a faulty attitude not based on any facts that such vacuum packaging "protects" the coffee therein for months or even years. These assertions, can easily be dispelled by the use of the $CO_2$ and oxygen analyzers readily available today and easily operated. These instruments reveal what is really happening to the roast coffee in the various packages. The highlights of these analytical revelations is that they can reveal how aged was the coffee when it was packaged based on $CO_2$ content. These instruments show that the roasted coffee, whole bean or roast and ground, rapidly reacts with the oxygen in the air, e.g., practically all packaged beans or roast and ground coffee has zero % oxygen present in the container within 12 hours of packaging, because any oxygen that had remained in the bag or can has reacted with the coffee. Preliminary test results show that roast bean coffee in a valve bag sealed with air will have its oxygen reduced from 20.8% to 10% or less in a few days after packaging. This is accompanied by a loss in aroma, and increased bitterness and stale notes. Freshly roasted coffee is not bitter, and gives a smooth tasting beverage, whereas roast coffee only days from roasting, shows at room temperature a lack of smoothness, lack of aroma and bitterness.

Packaged roast coffees, whether in cans or bags, even at up to 10% oxygen will show zero percent oxygen after just several days of storage. The oxygen is reacting off with the linoleic acid of roasted coffee primarily, but is also oxidizing both aromatic and non-aromatic coffee constituents. Most, if not all, of the coffee processors, do not understand what has been stated here. So many of them buy expensive packaging machinery, e.g., for valve bag use, and believe that a shrunken bag over beans created by vacuum is protecting the coffee, when in fact the vacuum is partial and is leaving high percentages of oxygen in the sealed packages, which will react with the roasted coffee in less than 12 hours. The undefined use of the term "vacuum" is clearly fooling the packaging manufacturer, the roaster/packer and the consumer. In fact some consumers are so naive, that they believe the whole roast beans are fresh, and that vacuum packed coffees are "fresh".

Although small local roasting establishments, called specialty coffee shops, can deliver roasted beans to consumers only a day or few days out of the roasting machine, even 1,000 such places all over the USA, for example, can only supply approximately 5% of the total market demand. And so, it becomes very important to find better means of preservation of the roasted beans until they reach the consumer.

It is important to also appreciate the fact that with roast bean storage, even in the first 3 days after roasting, when about 90% of the $CO_2$ is evolving, that oxygen is not being excluded, and so oxidation is occurring. This phenomena is called gas "diffusion", and it occurs rapidly, within minutes. Therefore, to keep silos and bins, oxygen free is not an easy task nor is it being effectively done in the roasting plants, that choose to degas $CO_2$ before packaging.

Further, the convenience aspect of packaging ground roast coffee beans for the consumers who do not own or use grinders, causes excessive and devastating deterioration of the coffee taste quality. The consumer pays a heavy price when he accepts such convenience, as well as 2 and 3 pound packs, which can only be consumed in 2 to 3 weeks, with roast and ground coffee exposed to air with 20.8 volume % oxygen.

SUMMARY OF THE INVENTION

In accordance with the invention, freshly roasted coffee is stored in a package wherein the oxygen in the package is evacuated or inert gas purged to below 1% $O_2$. Another aspect involves cooling and storing the roasted coffee at a very low temperature. Freshness, aroma and flavor are thereby maintained.

Accordingly, it is an object of the present invention to provide improved methods for maintaining "just" roasted coffee in a fresh state.

It is another object of the invention to provide an improved coffee storage system for roast coffee beans to keep the aroma and flavor as close to that of fresh roasted coffee as possible.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

The system according to a preferred embodiment of the present invention comprises a process of inert gas purging and/or evacuating the container of roasted coffee beans to obtain below 1% $O_2$. Another embodiment employs the process of storing roasted coffee beans at low temperatures, as low as from −10 degrees F. to −50 degrees F. or lower. Finally, the combination of a) the purging and/or evacuation to attain below 1% $O_2$ and b) very low temperature storage provides the capability of long-term quality coffee storage, while maintaining fresh roasted coffee flavor.

Taste tests show that vacuum packaging of roast coffee beans stored at room temperature requires much less than 1 volume % oxygen to give effective preservation, and that 0.20 volume %, or less, is necessary. In other words, at least ten times less than what the best traditional canning/pouching methods achieve. Table I illustrates the magnitude of $O_2$ evacuation:

TABLE I

Relating Vacuum Level to Oxygen Content & Air Volume

| % Evacuation Level | Absolute inches | Pressure mm Hg | % $O_2$ content | Relative Vol Air removed |
| --- | --- | --- | --- | --- |
| None | 29.92 | 760 | 20.8 | 1 |
| 90 | 2.99 | 76 | 2.1 | 10 |
| 95 | 1.50 | 38 | 1.04 | 20 |
| 97.5 | 0.75 | 19 | 0.5 | 40 |
| 99 | 0.30 | 8 | 0.21 | 100 |

As the evacuation gets higher, more air volume needs to be removed, hence more work or Horse power is required to achieve lower levels of oxygen. When in the 1930's a 2 to 4 volume % oxygen residue in the can was adopted, that was a commercial-economic subjective decision by the can packaging firms partly based on minimal taste quality acceptable to consumers, and, using a low standard of freshness.

Figure 1:
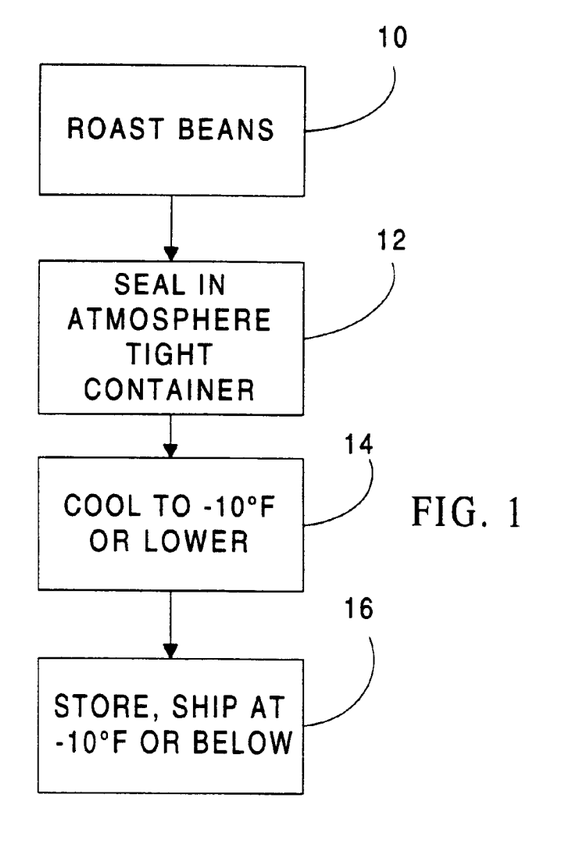
FIG. 1 is a flowchart of a $1^{st}$ process for keeping roast coffee bean freshness by chilling only.

Referring to FIG. 1, which is a flowchart of a chilling process for keeping roast coffee bean freshness, according to a first embodiment, coffee beans are roasted (step 10) and are next sealed in an atmosphere tight container (step 12). The container may comprise, for example, a valve bag that is suitably constructed of synthetic laminates, having a pressure relief valve therein to allow gas to escape the sealed bag, but preventing entry of outside air into the bag. These bags are well known in the art and widely used in trade. Next, is step 14, wherein the package of roasted beans is cooled to low temperatures, −10 degrees F. or preferably lower (e.g., −20, −30, −40 or −50 degrees F). The beans are stored and shipped at these low temperatures. Examples discussed herein illustrate the advantages thereby obtained.

Figure 2:
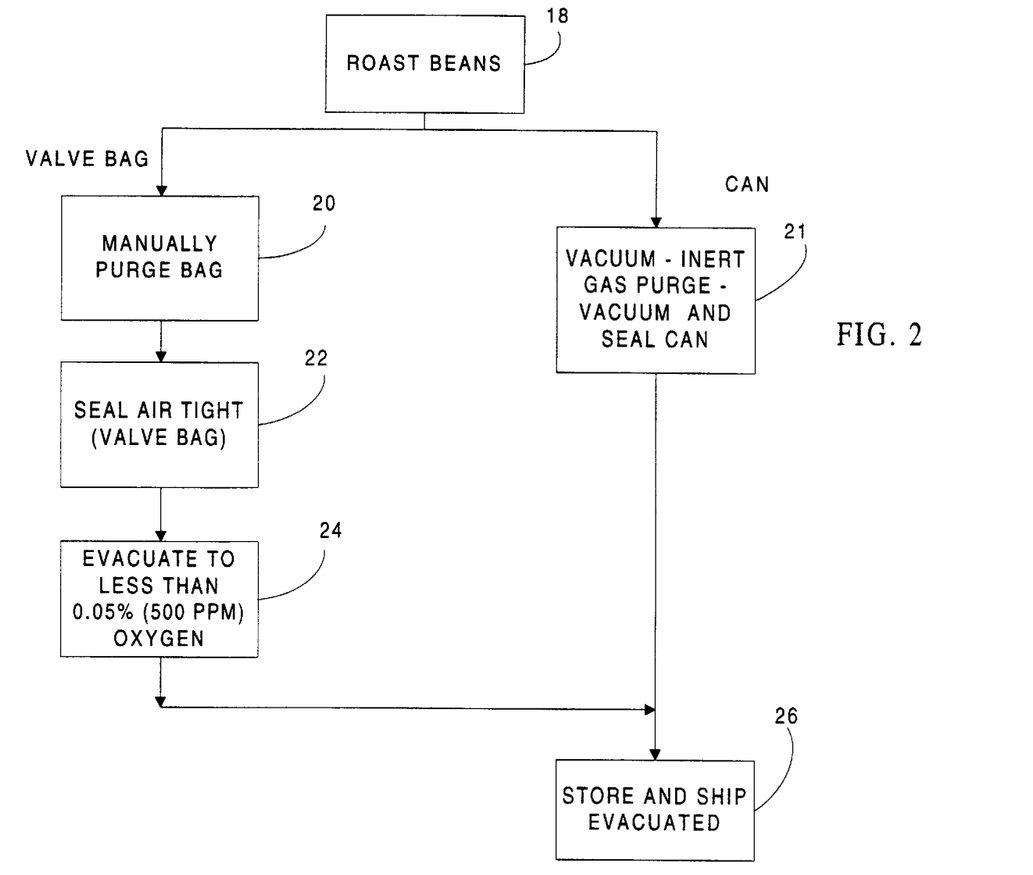
FIG. 2 is a flowchart of a $2^{nd}$ process for keeping roast coffee bean freshness by inert gas purging and then evacuating to low $O_2$ levels.

Referring to FIG. 2, a flowchart of a second process for keeping roast coffee freshness, the beans are first roasted as in the process of FIG. 1 (step 18). Note that in FIG. 2, there are two routes that may be used. The valve bag route, with manual purge and bag seal (steps 20, 22), followed by placing the bags in an evacuated chamber (step 24) which is slower and requires less equipment but more labor. Whereas the placement of a clinch covered can of coffee in an air tight chamber, calls for a three step process: Vacuum, inert gassing and then vacuum (step 21), with the ability to close the can cover while it is in the vacuum chamber, or to do a four step process: Vacuum, gassing, vacuum and gassing again, with rapid removal of the clinched cans for final cover closure outside the vacuum/gas chamber. A vacuum-gas-vacuum cycle for cans will give lower $O_2$ and is amenable to converting existing vacuum canning machinery.

The preferred level of evacuation now given is 0.05% volume % oxygen or less (500 ppm). The more inert gas purging is used to reduce $O_2$, then less evacuation is required. Not purging, or less purging will necessitate a more powerful vacuum pump both in volume handled as well as higher vacuums required. Any number of combinations of vacuum and gassing can be used to attain 0.05 volume % $O_2$ in the final packaged coffee container, by those skilled in such activities. The valve bags or cans are stored and shipped in this state (step 26).

Figure 3:
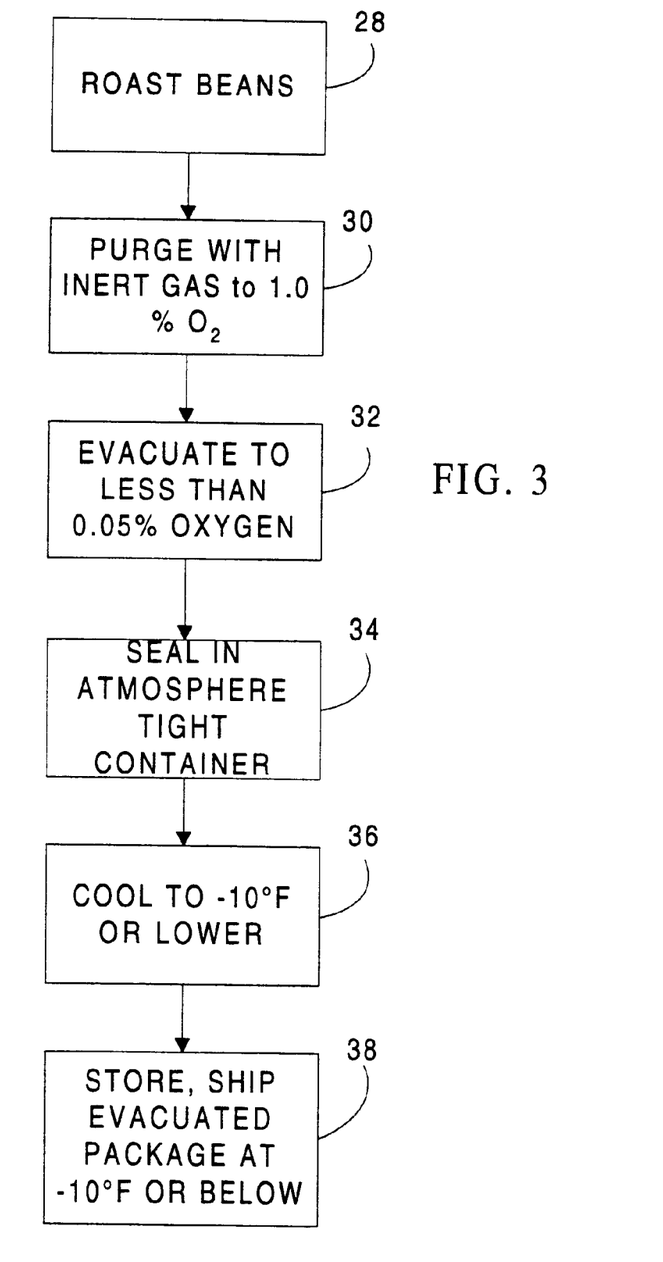
FIG. 3 is a flowchart of a $3^{rd}$ process for keeping coffee bean freshness by inert gas purging, evacuating to low $O_2$ levels and then cooling.

Now, referring to FIG. 3, a flowchart of a third process for keeping coffee bean freshness, the combination of the processes of FIG. 1 and FIG. 2 provides an even greater advantage in shelf life and results in better taste/aroma of coffee brewed from the stored beans. In FIG. 3, again, the beans are roasted (step 28), purged and evacuated (steps 30 and 32) and sealed in an atmosphere tight container (step 34). Then, the sealed container is cooled to a very low temperature (step 36) of less than −10 degrees F. (−23.3 C.), −20 degrees F. (−28.9 C.), −30 degrees F. (−34.5 C.), preferably −40° F. (−40 C.), −50 degrees F. (−45.5 C.) or lower. The evacuated and cold containers are then stored and shipped at low temperature (step 38). Accordingly, fresh roast coffee flavor and aroma are preserved.

Lower temperatures extend the storage life of the coffee. For example, storing the coffee at −50° F. (−45.5 C.) or −55° F. (−48.3 C.) can provide remarkable flavor retention even after several months storage.

Figure 4:
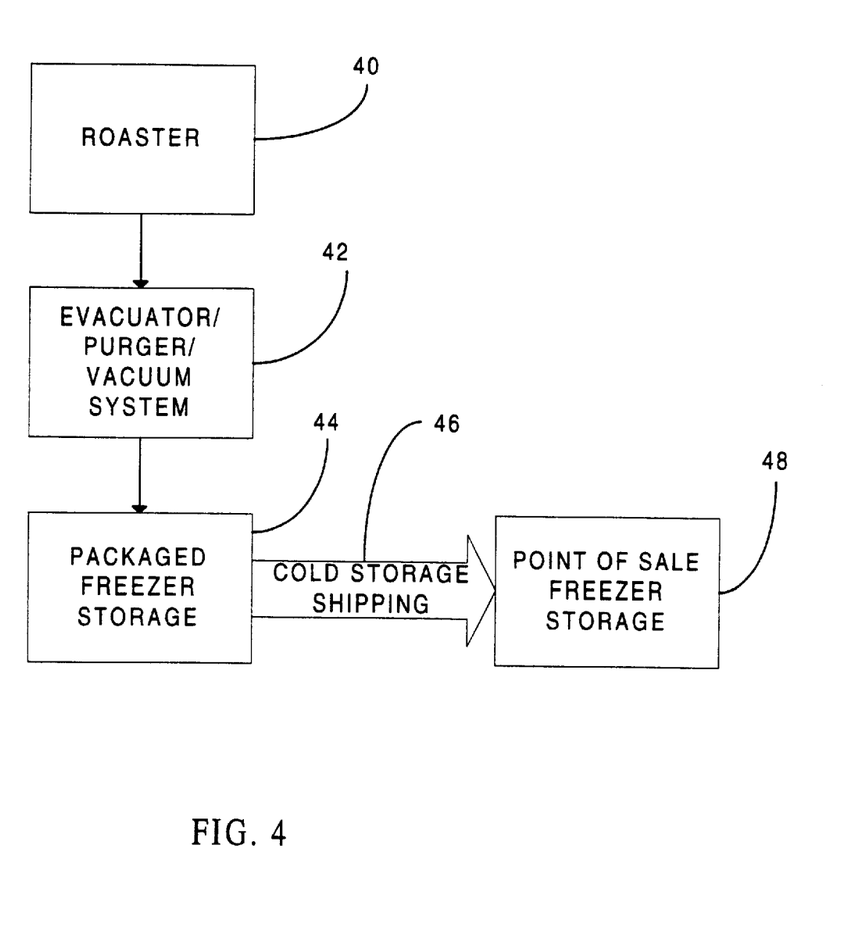
FIG. 4 is a block diagram of apparatus system for keeping roast coffee bean freshness using the methods of FIGS. 1–3.

FIG. 4 is a block diagram of a combined system for keeping roast coffee bean freshness. A coffee roasting machine 40 is employed to roast the coffee beans, and may comprise, for example, the COFFEE ROASTING SYSTEM of U.S. Pat. No. 3,964,175 (Sivetz). From the roaster, the beans are placed in a purger/evacuator apparatus 42, which packages the roasted beans at a very low oxygen content. From the purger/evacuator, the beans in their sealed containers are placed in storage freezer 44, which is suitably of very low temperature as discussed hereinabove. The beans are transported in cold storage shipping system 46 and are kept in point of sale storage freezer 48 until use or purchase by a consumer.

In accordance with the process and apparatus disclosed herein, the traditional $CO_2$ de-gassing step that is normally performed after the beans are roasted is not needed. Thus, the roasted beans are not exposed to oxygen during such a de-gassing step, and oxidation of the beans is thereby avoided at this early stage.

The absolute standard of roaster freshness, is exactly what it says, namely the taste at the time of receiving "just roasted" coffee beans (within an hour of roasting). A sample roaster can deliver such a fresh roast standard at any time. Tests performed by the applicant show that that a taste much closer to fresh roast taste can be maintained at 0.2 volume % $O_2$, than over 2% $O_2$ after weeks at room temperature. This relationship of freshness preservation at the lesser oxygen levels of packaging, combined with the elimination of the $CO_2$ degassing steps, and faster transfer of package from factory to consumer, constitutes a marked product quality improvement over traditional and current trade practices.

The increased cost for getting higher vacuums with larger vacuum pumps moving larger volumes of air, is easily offset by preliminary purging of the packages with inert gas down to less than 1.0 volume % oxygen, and sealing valve bags, and then placing sealed bags in a 90+% vacuum, and obtaining less than 0.20 volume % oxygen, the desired protective level (or even less). Roast bean storage tests over 8 weeks have shown at 300 ppm $O_2$ at 60° F., excellent preservation of fresh roast coffee bean taste.

TABLE II

METHOD FOR OXYGEN REDUCTION IN BAG OR CAN PACKAGES OF FRESHLY ROASTED COFFEE PROCESSED AT ROOM TENPERATURE

| METHOD | Inert Gas Purge to 1.0% O2 (P) | Seal Bag or Can (S) | High Level * Evacuation of Chamber with Bag or Can (V) |
|---|---|---|---|
| A | — | 1 | 2 |
| B | 1 | 2 | 3 |
| C | 1 | 3 | 2 |

\* - High level means 90% (1/10th the amount of $O_2$ after purging), 95% (1/20th the amount of $O_2$ after purging) or 97.5% (1/40th the amount of $O_2$ after purging) evacuation.

In accordance with the methods of Table II, in method A, the inert gas purging step is not performed. First, the valve bag or can with clinched cover undergoes a high level evacuation, and then the can cover is sealed. In method B, first the inert gas purging is done to reduce the oxygen to 1.0%. Next the valve bag or can with clinched cover undergoes a high level evacuation, and then the can cover is sealed. In method C, the order of the seal and evacuation is reversed, wherein the evacuation is performed before sealing.

Note that the oxygen level in the final package can be attained in several ways, for example:

1. Can or bag of roast beans or R&G coffee is inert gas flushed ($CO_2$ or $N_2$) until its oxygen level falls to about 1.0 vol %, in a gas tight chamber. The flushed bag is exposed to an evacuator at several levels, e.g.

90% leaving 76 mm Hg pressure, and theoretically 0.1 vol % $O_2$, or

95% leaving 38 mm Hg pressure, and theoretically 0.05 vol % $O_2$, or 97.5 % leaving 19 mm Hg pressure, and theoretically 0.025 vol % $O_2$ (250 ppm).

The bag is sealed while the chamber is under vacuum. Breaking the vacuum to the atmosphere allows air to enter the chamber, which will shrink the bag about the beans or R&G coffee. However, since the roast coffee in a valve bag is still giving off $CO_2$ gas, the bag surface will relax away from its contents within about 8 hours, depending on the nature of the coffee, its degree of roast, granulation, moisture and storage temperature. The vacuum sealed can will build up pressure due to continued release of $CO_2$ gas from the coffee.

2. The same container of roast coffee beans or R&G is inert gas flushed but not in an air tight chamber. The package can be sealed at this point with about 1.0 vol % oxygen. The inert gas purged package of coffee is placed in a chamber and evacuated, then $1/10$, $1/20$, $1/40$ reduced vol % oxygen levels will be attained.

An evacuated can will retain its shape, whereas a valve bag will shrink about the coffee. In both cases, can or bag, the oxygen level therein will fall to between $1/10$th to $1/40$th of the approximately 1% $O_2$ level attained after inert gas purging.

Ratio of Purge/Vacuum

The choice of how much purging and how much vacuum is used to achieve the less than 1000 ppm $O_2$ level, will be determined by those skilled in this art, based on storage taste tests, production, labor, and equipment costs.

Either method #1 or #2 above can be followed by the steps of promptly cooling the packages, to between −10 and −50° F. for storage and for transport to consumer purchase areas.

The embodiment of this invention which is preferred in practice will be determined by the processors' objectives. That is, by example, the less than 500 ppm oxygen package may be such a marked upgrade in fresh roast coffee quality over what the market now experiences, that the added cost for cold processing and cold storage and transport, may be deemed un-necessary at that time. However, the processor who profitably sells and produces coffee by also utilizing the cooling, cold storage and transport after packaging at 500 ppm $O_2$ or less, will carry the process through the cold steps.

It is clearly cheaper to not go to the cold process steps. However, there may be consumer quality preferences that require the added cold processing steps over the ambient purging/evacuation methods. In any case, here are two paths to preserving freshly roasted coffee tastes at low $O_2$ and −10/−50° F. storage when the combination of both methods is employed for an ultimately near perfect preservation.

This invention has an extended feature in preserving freshly roasted coffee-bean tastes, that is, the market as it exists operates at room temperature. By reducing the temperature of the roast coffee in the packages described the preserved quality of the beans/roast and ground is effectively extended, as illustrated by the following examples (measurements were made using Mocon brand $CO_2/O_2$ analyzers)

EXAMPLE 1

Roasted beans were sealed in air in valve bag and stored at −50° F. (−45.5 C.). The original 20.8 volume % $O_2$ only falls about 4 volume %, to approximately 16% $O_2$ in 8 weeks (duration of test), while the $CO_2$ rises only to about 5%. This shows that only $\frac{1}{5}^{th}$ of the available oxygen has reacted with the roast coffee, and only about 5% of the possible $CO_2$ is liberated from the beans. The taste is very close to freshly roasted beans. Whereas the same beans at 60° F. (15.5 C.) in a sealed bag have reduced the oxygen level to about 10% $O_2$, and the $CO_2$ has risen to about 75 volume %, with the resulting beverage taste being bitter and stale. If a 3 volume % $O_2$ is used at the time of packaging, there is no $O_2$ left at 60° F. within 8 hours, and the coffee tastes bitter and progressively more stale within the next several days.

EXAMPLE 2

Roasted beans were placed in a valve bag under 90% vacuum and 2.2 volume % $O_2$, and stored at 60° F. (15.5 C). Within 12 hours, the bags had 0% $O_2$. The $CO_2$ level rises in the first 3 days to about 75 volume %, and the taste is acceptable but slightly bitter.

EXAMPLE 3

Roasted beans were placed in a valve bag under 90% vacuum and 2.2 volume % $O_2$, as in Example 2, but were stored at −10° F. (−23.3 C.) in a domestic freezer. The bag retains its shrunken shape and brick hardness for several weeks. The cup taste 1, 2 and 4 weeks later was always better than the cup taste from beans from Example 2.

EXAMPLE 4

Roasted beans were placed in a valve bag under 90% vacuum and 2.2 volume % $O_2$, as in Examples 2 and 3, but were stored at −50° F. (−45.5 C.) in a scientific grade freezer. The beans showed at 90% vacuum less than 20% loss in oxygen and only a 15% $CO_2$ level after 3 weeks at −50° F. (−45.5 C.), and an excellent fresh roast beverage taste. The package is brick hard. Note that it takes about 12 hours for the cold vacuum packed bag to warm up to 60° F. (15.5 C.) and to relax enough so that $CO_2/O_2$ analyses can be made, and this "warm-up" period causes $O_2$ to fall and $CO_2$ to rise by an indeterminate amount. It is certain that the $CO_2/O_2$ levels in the bag are even lower/higher before the warm up period.

Processing equipment is commercially available to attain by vacuum and/or inert gas purging less than 1,000 ppm (0.1%) oxygen at the time of packaging. Suitable freezers are also commercially available to store the packages at −10° F. (−23.3 C.) (domestic) or −40° F. (−40 C.) (ice cream), or −50° F. (−45.5 C.) (scientific), all available at practical pricings to achieve these processing conditions and consistent with a profitable specialty coffee business and today's specialty coffee retail pricings.

Therefore, improved methods and systems for processing and storing roasted coffee (preferably in bean form) has been described. The freshly roasted taste and aroma of the coffee is maintained, enhancing the consumer's enjoyment of the coffee.

While plural embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A method of packaging whole coffee beans to substantially retain the freshness, aroma and flavor thereof, comprising the steps of:

roasting whole coffee beans, thereby producing "just" roasted whole coffee beans;

packaging the "just" roasted whole coffee beans by placing the "just" roasted whole coffee beans in an air tight container; and reducing the oxygen level in the container to less than or equal to 0.2% $O_2$ by other than absorption or reaction with the "just" roasted whole coffee beans, wherein said steps of roasting, packaging and reducing oxygen are performed while said whole coffee beans are in the "just" roasted state.

2. The method of packaging coffee beans according to claim 1, wherein said step of reducing the oxygen level comprises reducing the oxygen level in the container to 0.05% $O_2$ or less.

3. The method of packaging coffee beans according to claim 1, wherein said step of reducing the oxygen level comprises reducing the oxygen level in the container to 0.1% $O_2$ or less.

4. The method of packaging coffee beans according to claim 1, wherein said step of reducing the oxygen level comprises inert gas purging and/or evacuating the container to attain the desired oxygen level.

5. The method of packaging coffee beans according to claim 1, wherein said container comprises a valve bag.

6. The method of packaging coffee beans according to claim 1, wherein said container comprises a can or relief valve can.

7. A method of storing "just" roasted unground coffee beans that are in a "just" roasted state comprising the steps of:

placing the "just" roasted unground coffee beans in a valve bag while said "just" roasted unground coffee beans are still in the "just" roasted state, sealing the valve bag; and storing said valve bag with the "just" roasted unground beans therein at a temperature of −10 degrees F. or less, said storing step being performed while said "just" roasted coffee unground beans are still in the "just" roasted state.

8. A method of storing "just" roasted unground coffee beans that are in a "just" roasted state comprising the steps of:

placing the "just" roasted unground coffee beans in a valve bag, said placing step being performed while said "just" roasted unground coffee beans are still in the "just" roasted state, sealing the valve bag; and storing said valve bag at a temperature of −20 degrees F or less, wherein said placing step, said sealing step and said storing step are performed while said "just" roasted unground coffee beans are still in the "just" roasted state.

9. The method according to claim 8, wherein said storing step comprises storing at a temperature of −30 degrees F. or less.

10. The method according to claim 8 wherein said storing step comprises storing at a temperature of −40 degrees F. or less.

11. The method according to claim 8, wherein said storing step comprises storing at a temperature of −50 degrees F. or less.

12. A method of packaging "just" roasted whole coffee beans comprising the steps of:
   placing the "just" roasted whole coffee beans in an air tight container;
   inert gas purging and/or evacuating the container to less than 0.2% $O_2$;
   sealing the container to maintain the evacuation;
   storing the sealed container at a temperature less than −10 degrees F, said placing step, said inert gas purging and/or evacuating step, said sealing step and said storing step being performed while said "just" roasted whole coffee beans are still in the "just" roasted state.

13. The method according to claim 12, wherein said storing step comprises storing at a temperature less than −20 degrees F.

14. The method according to claim 12 wherein said storing step comprises storing at a temperature less than −30 degrees F.

15. The method according to claim 12, wherein said storing step comprises storing at a temperature less than −40 degrees F.

16. The method according to claim 12, wherein said storing step comprises storing at a temperature less than −45 degrees F.

17. The method according to claim 12, wherein said storing step comprises storing at a temperature less than −50 degrees F.

18. The method according to claim 12, wherein said evacuating step comprises evacuating to less than 0.1% $O_2$.

19. The method according to claim 12, wherein said evacuating step comprises evacuating to less than 0.05% $O_2$.

* * * * *